United States Patent [19]

Salonimer et al.

[11] 4,049,969
[45] Sept. 20, 1977

[54] PASSIVE OPTICAL TRANSPONDER

[75] Inventors: David J. Salonimer; Buster E. Kelley, both of Huntsville, Ala.

[73] Assignee: The United States of America as represented by the Secretary of the Air Force, Washington, D.C.

[21] Appl. No.: 24,917

[22] Filed: Mar. 19, 1970

[51] Int. Cl.² ............................................... F21K 2/00
[52] U.S. Cl. .................................. 250/458; 250/199; 356/5
[58] Field of Search .................. 250/71, 77, 199, 458, 250/459, 461; 356/5

[56] References Cited

U.S. PATENT DOCUMENTS

| | | | |
|---|---|---|---|
| 1,385,657 | 7/1921 | Bell et al. | 250/71 X |
| 2,334,765 | 11/1943 | Hermann | 250/77 X |
| 2,417,384 | 3/1947 | Switzer | 250/71 |
| 2,519,825 | 8/1950 | DeMent | 250/71 |
| 2,653,109 | 9/1953 | Switzer | 250/71 X |
| 3,305,633 | 2/1967 | Chernoch | 250/199 X |
| 3,380,358 | 4/1968 | Neumann | 356/5 |

FOREIGN PATENT DOCUMENTS 519,901  4/1940  United Kingdom ................... 250/77

Primary Examiner—Benjamin R. Padgett
Assistant Examiner—Deborah L. Kyle
Attorney, Agent, or Firm—Joseph E. Rusz; Arsen Tashjian

[57] ABSTRACT

An optical identification and communication system wherein an interrogator sends out a broad illuminator beam outside the visible range. Some of this radiation is collected by the transponder optic and focused on a converting phosphor. The response light is recollimated by the transponder optic and transmitted directly back at the interrogator. The use of co-axial optics along with color filters and an electronic "shutter" in the interrogator enables the transmitted and received radiation to be separated.

2 Claims, 1 Drawing Figure

INVENTORS
DAVID J. SALONIMER,
BUSTER E. KELLEY
BY Harry A. Herbert Jr.
and Arsen Tashjian
ATTORNEYS

PASSIVE OPTICAL TRANSPONDER

BACKGROUND OF THE INVENTION

This invention relates to a passive optical transponder and, more particularly, the invention is concerned with providing a transponder wherein the natural ultra-violet light from an interrogator is focused on a phosphor which gives off visible light during its excitation cycle. The response light is a different color from the interrogation light and can be used as a means for location and identification of friendly forces.

In general, communication between two remote sites is presently carried out by means of voice communication through the use of telephone or radio, or by Morse code light signals. In each of these systems, various situations arise which make their use highly disadvantageous or impossible of operating, such as when transmitting classified communications and where ground forces are being tracked by a tactical air support team. Also, the problems of frequency allocation in regard to radio broadcasting and the problem of wires when involved with telephones limit the practical capability of these systems under certain conditions. In addition, each of the above known systems for intelligence communication are subject to being monitored by those for which the communications are not intended, and may be jammed or intercepted by undesirable recipients while also requiring considerable set up time and maintenance.

Thus, there is an urgent need in the art for a simple and reliable identification and communication system which is not subject to interception and jamming and which can be operated under adverse conditions by semi-skilled personnel without the requirements of expensive and time-consuming set up and maintenance problems.

SUMMARY OF THE INVENTION

The present invention provides a system whereby a passive optical transponder can be used as an identification and communication device. A collimated light at one wavelength is focused upon a phosphor device which responds at a different wavelength in the visible portion of the spectrum. When interrogated from the air by natural ultra-violet light, the phosphor receiver gives off visible light during its excitation cycle, thus revealing the ground position of friendly forces.

In principle, the transponder is a means for air-to-ground identification and communication. An interrogator includes an infrared laser and a lenticular lens which performs the functions of both spreading the illuminator light and making its distribution of intensities uniform.

The transponder functions in response to the interrogator which sends out a broad illuminator beam. Some of this light, which may be in the infrared range, is collected by the transponder optic and focused on the converting phosphor. The response light being located at the focus of the optic, is recollimated naturally by that optic and transmitted directly back at the interrogator. The use of co-axial optics in the interrogator enables the response to be "seen" at the interrogator's location. Color filters and an electronic "shutter" in the interrogator enable the transmitted and received light to be properly separated.

Accordingly, it is an object of the invention to provide a simple, lightweight, passive optical signalling device which is especially useful for locating an identifying friendly forces on the ground from the air or other remote locations.

Another object of the invention is to provide an optical signalling device which is highly reliable since all processes are generally passive in nature.

Still another object of the invention is to provide an optical transponder including phosphor elements which are "pumped" with natural ultra-violet light and discharged with infrared light. In their last excitation cycle the phosphors give off visible light.

A further object of the invention is to provide a passive optical transponder which is suitable for use in the identification of friendly forces by attachment to the soldier's clothing or helmet.

A still further object of the invention is to provide a passive optical transponder wherein a fully color-corrected flat field optic provides the needed field of view, thereby permitting a flat disc configuration of the phosphor elements.

These and other objects, features and advantages will become more apparent after considering the description that follows taken in conjunction with the attached drawings wherein like numbers are used throughout to identify like elements.

DESCRIPTION OF A PREFERRED EMBODIMENT

Figure 1:
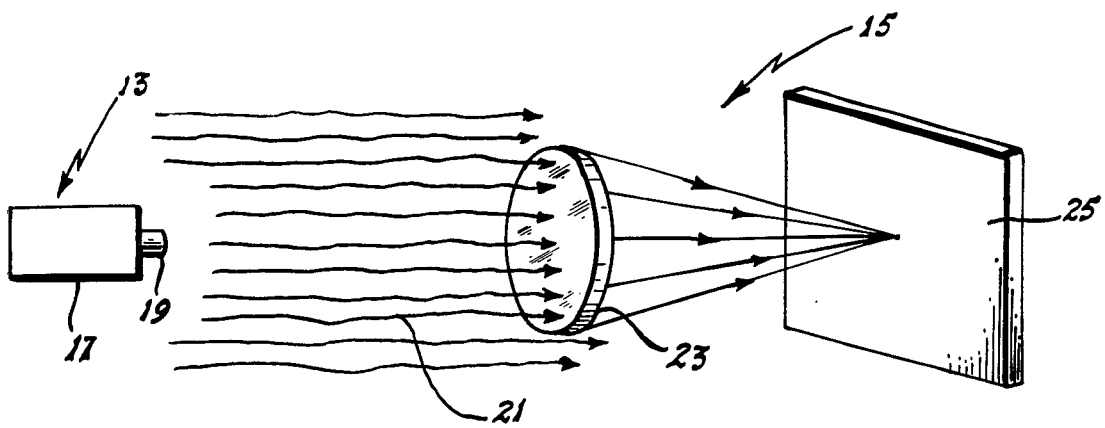
FIG. 1 is a view in schematic of the light from the interrogator being focused on the phosphor by the optic.

Referring now to the drawings, there is shown in FIG. 1 a passive optical transponder interrogation cycle. The key subsystems include an interrogator 13 and a transponder 15. The interrogator 13 includes an infrared laser 17 and a lenticular lens 19 which performs the functions of both spreading the illuminator light and making its distribution of intensities uniform. The present application is concerned primarily with the transponder 15.

Figure 2:
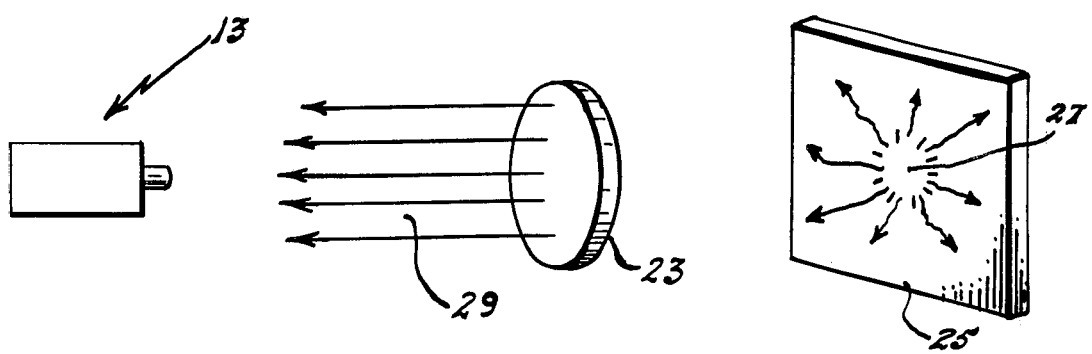
FIG. 2 is a view in schematic of the flash from the phosphor being recollimated by the optic and transmitted back along the arrival path.

The interrogator 13 sends out a broad illuminator beam 21. Some of this light 21, which may be infrared, for example, is collected by the transponder optic 23 and focused on the converting phosphor 25. The response light 27 (FIG. 2) being located at the focus of the optic 23 is recollimated naturally by that optic to form the beam 29 which is transmitted directly back at the interrogator 13. The use of coaxial optics in the interrogator 13 enables the response to be "seen" at the interrogator's location. Color filters and an electonic "shutter" in the interrogator 13 enable the transmitted and received light to be properly separated.

The passive optical transponder 15 operates like an optical corner reflector except the response light 29 is a different color from the interrogation light 21. The responder beams its light along a path directly counter to the line of interrogator light approach. The response beam 29 is well collimated so that the system can be considered highly secure. The interrogation light 21 will generally be from a pulsed neodymium laser 17 whose output beam is spread and made uniform by a lenticular beam spreader 19. This precludes dark spots in the pattern and assures that any small object in the interrogator's field of view will receive its respective share of illumination. The neodymium laser's output will be invisible that is, the human eye response to 1.06 micron light is very poor. The transponder 15 itself is configured as a collecting optic 23 with one of the infrared-to-visible converting phosphors 25 at the focus. The collecting optic 23 must either be a mirror or a lens system whose focal length is the same for both the interrogator's wavelength and the wavelength of the responder light. Thus the interrogator's light 21 is focused on the phosphor 25 by the optic 23. The phosphor's flash then, being at the optic's focus, is recollimated by the same optic 23 and transmitted back along the arrival path.

There are at least two phosphors known which will do the conversion, principally the "Kodak IR Phosphor", manufactured by the Eastman Kodak Company, and the recently reported Lanthanum Fluoride Phosphor, manufactured by the General Electric Company. The Kodak IR Phosphor is capable of receiving light at about 1 micron wavelength and responding at about 6300 A wavelength. The material is fine grain and response time constants are reported as in the neighborhood of a microsecond.

The hereinbefore described concept is called "passive" since no power is needed or utilized. The element 15 is called a transponder since the frequency of radiation from the interrogator 13 is transformed and then beamed back along the path of illumination. The interrogator subsystem utilizes high speed shutters to preclude the illuminator backscatter glows from affecting the performance of the device. In ordinary use the interrogator operator will depress a switch initiating the outgoing pulse 21. The response pulse will be generated immediately and send a collimated beam 29 right back at the transmitter. Transmitter/receiver isolation is achieved by the spectral separation of the transmitted beam 21, which may be 1.06 microns and the response beam 29 which may be on the order of 6300 A.

MODE OF OPERATION

The Passive Optical Transponder 15 is a system element with a simple function. The complete system includes an interrogator/receiver subsystem 13 that issues a broad beam pulse of invisible radiation. The optical transponder 15 collects a small sample of that pulse, converts it to some other color of light and re-transmits it in a small well-collimated beam 29 directly back at the interrogator 13. In general, the passive optical transponder may be used in air-to-ground military operations. The interrogator 13 contains a display system that shows a real time image of the real world scene. Immediately after the illuminator pulse is issued the transponders within the illumination field of view will respond and the system operator will see the "real world" scene with points of light flashing in response to the interrogator pulse. These points of light represent the locales of the friendlies. Color coding and optical filters can be used for security and control of background light.

With a properly configured interrogator 13 the responder 15 is usable in identification friendly forces systems and tracking beacons but mostly as a device of locations of friends from the air or other remote locations. The responder 15 is very highly reliable since all processes are generally passive in nature. The phosphors 25 are generally two stage phenomena. They are "pumped" with natural ultra-violet light and discharged with infrared light. They give off visible light in their last excitation cycle. For identification friendly forces use, the transponder 15 should be configured suitably and situated on the soldier's clothing or helmet. The ranges of operation are dependent upon the collection area of the transponder 15, the efficiency of conversion, the quality of the optic and its ability to recollimate the phosphor's response along with other factors such as atmospheric attenuation, etc. The actual design of the transponder 15 takes into account the needed field of view to be a fully color-corrected, flat field optic. Then the phosphor 25 can be a flat disc in shape.

The use of an optical corner reflector for identification friendly forces has been suggested by others. The present concept is new in that the device transposes the color of the response beams from that of the illuminator to something else. The potential is such that a button-like device can serve as a transponder.

Color coding provides for military security and easy separation of transmitted and received beams. Many uses for the present device can be envisioned when coupled with an interrogator/receiver. If the proper response is noted, that is, proper color and short delay from when interrogator pulse is emitted, the operator can positively determine the presence of friendlies in the locale of the response flashes. The interrogator/receiver employs a regular pulsed shutter so that the operator can view the scene in the illuminated field of view in apparent real time terms. Thus, the visible scene is blanked periodically and the "shutter" is held "open" for a few milliseconds after the firing of the illuminator. This suppresses the apparent brightness of the scene in favor of the illumination pulse.

Although the invention has been illustrated in the accompanying drawing and described in the foregoing specification in terms of a preferred embodiment thereof, the invention is not limited to this embodiment or to the preferred configuration mentioned. It will be apparent to those skilled in the art that our invention will be useful for long standoff identification friendly forces and/or rescue and fire direction applications. Also, it should be understood that various changes, alterations, modifications and substitutions, particularly with respect to the construction details, can be made in the arrangement of the several elements without departing from the true spirit and scope of the appended claims.

Having thus described our invention what we desire to claim and secure by Letters Patent of the United States is:

1. In an optical identification and communication system having a combination interrogator and receiver for generating and receiving radiation signals; a passive optical transponder comprising a phosphor device for receiving a converting light from the interrogator, a transponder optic positioned between said phosphor device and said interrogator for collecting and focusing light of a specified wavelength from the interrogator onto the surface of said phosphor, thereby converting the light from the interrogator to a different wavelength and re-transmitting the converted light along the same path back to the receiver in a beam that is re-collimated by said transponder optic, allowing a response light of a different color from the interrogator light to be used to locate and identify friendly forces.

2. The optical identification and communication system defined in claim 1 wherein the interrogator includes an infrared laser and a lenticular lens, said lens operating to spread the light from the interrogator and make its distribution of intensities uniform.

* * * * *